(12) United States Patent
Jantz et al.

(10) Patent No.: US 10,984,091 B2
(45) Date of Patent: *Apr. 20, 2021

(54) METHODS AND SYSTEMS FOR VALIDATING AN AUTONOMOUS SYSTEM THAT INCLUDES A DYNAMIC-CODE MODULE AND A STATIC-CODE MODULE

(71) Applicant: NAGRAVISION S.A., Cheseaux-sur-Lausanne (CH)

(72) Inventors: Scott Jantz, Gainesville, FL (US); Steven Seltzer, Hermenches (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 85 days.

This patent is subject to a terminal disclaimer.

(21) Appl. No.: 16/102,701

(22) Filed: Aug. 13, 2018

(65) Prior Publication Data

US 2018/0357409 A1 Dec. 13, 2018

Related U.S. Application Data

(63) Continuation of application No. 14/970,167, filed on Dec. 15, 2015, now Pat. No. 10,073,965.

(51) Int. Cl.
*G06F 21/44* (2013.01)
*G06F 21/51* (2013.01)
(Continued)

(52) U.S. Cl.
CPC .............. *G06F 21/44* (2013.01); *G06F 21/51* (2013.01); *G06F 21/57* (2013.01); *G06N 3/0454* (2013.01);
(Continued)

(58) Field of Classification Search
CPC .......... G06F 21/44; G06F 21/51; G06F 21/57; H04L 9/0861
See application file for complete search history.

(56) References Cited

U.S. PATENT DOCUMENTS 6,914,637 B1 * 7/2005 Wolf .................. H04N 21/2383
348/473
2006/0089800 A1 4/2006 Svendsen
(Continued)

FOREIGN PATENT DOCUMENTS

WO 2012027588 3/2012

OTHER PUBLICATIONS

International Search Report for PCT/EP2016/081174, dated Feb. 13, 2017, 11 pages.
(Continued)

*Primary Examiner* — Thanhnga B Truong
*Assistant Examiner* — Angela R Holmes
(74) *Attorney, Agent, or Firm* — Oblon, McClelland, Maier & Neustadt, L.L.P.

(57) ABSTRACT

Disclosed herein are methods and systems for validating an autonomous system that comprises a static-code module and a dynamic-code module, the method including the steps of performing a code-integrity-validation process on the static-code module and performing a behavior-integrity-validation process on the dynamic-code module. In some embodiments, performing the code-integrity-validation process on the static-code module includes performing a signature-verification process on the static-code module. In some embodiments, performing the behavior-integrity-validation process on the dynamic-code module includes using an encrypted-and-signed test vector. In some embodiments, performing the behavior-integrity-validation process on the dynamic-code module includes selecting a test vector from among a plurality of test vectors, generating a modified test vector at least in part by modifying the selected test vector, and performing the behavior-integrity-validation process on the dynamic-code module using the modified test vector.

20 Claims, 8 Drawing Sheets

(51) Int. Cl.
*G06F 21/57* (2013.01)
*G06N 3/04* (2006.01)
*H04L 9/08* (2006.01)
*G06N 20/00* (2019.01)
*G06N 7/00* (2006.01)
*G06N 5/00* (2006.01)

(52) U.S. Cl.
CPC .......... H04L 9/0861 (2013.01); *G06N 5/003* (2013.01); *G06N 7/005* (2013.01); *G06N 20/00* (2019.01)

(56) References Cited

U.S. PATENT DOCUMENTS

| | | |
|---|---|---|
| 2007/0198145 A1 | 8/2007 | Norris |
| 2009/0165135 A1 | 6/2009 | Lomont |
| 2010/0040281 A1 | 2/2010 | Chen |
| 2013/0097706 A1 | 4/2013 | Titonis |
| 2013/0254217 A1 | 9/2013 | Xu |
| 2014/0215621 A1 | 7/2014 | Xaypanya |
| 2014/0304752 A1* | 10/2014 | Lafabrie .......... H04N 21/23418 725/104 |
| 2015/0063633 A1* | 3/2015 | Hicks .................. H04L 63/08 382/103 |
| 2017/0142156 A1 | 5/2017 | Shiraishi |

OTHER PUBLICATIONS

International Preliminary Report on Patentability for PCT/EP2016/08117 dated Jun. 19, 2018.

\* cited by examiner

METHODS AND SYSTEMS FOR VALIDATING AN AUTONOMOUS SYSTEM THAT INCLUDES A DYNAMIC-CODE MODULE AND A STATIC-CODE MODULE

CROSS-REFERENCE TO RELATED APPLICATIONS

This application is a continuation of U.S. patent application Ser. No. 14/970,167, filed Dec. 15, 2015 and entitled "Methods and Systems for Validating an Autonomous System that Includes a Dynamic-Code Module and a Static-Code Module," which is hereby incorporated herein by reference in its respective entirety.

BACKGROUND

The autonomous robotics industry is rapidly achieving a long-promised level of technology and industry size. Within 5-10 years, the autonomous robotics industry may well be worth more than a trillion-dollars. Perhaps larger than any other high-technology sector. Many consumers will come into contact with numerous examples of these robots in many different roles including as home helpers and, increasingly, as autonomous cars. Aspects of home appliances (e.g., refrigerators, dishwashers, ovens, exercise equipment, lighting, etc.) will begin to resemble robots as more intelligence is incorporated into everyday objects. Some industry participants estimate that 1.5 trillion "Internet of Things" (IOT) devices could be online in 10 years. Simple economic reality may play a role in the adoption of autonomous robotics. As a combination of changing priorities and increasing income disparity puts car ownership out of reach for many, autonomous vehicles may become ever more prevalent. Savvy marketing could spread younger-generation enthusiasm for autonomous vehicles to older generations who may be more reluctant to change the way they think about vehicles and driving.

Various nightmare scenarios suggest that artificial intelligence (AI) will suddenly "wake up" and decide to harm humanity. However, it is more likely that these robots and IOT devices will be hacked for monetary profit, disruption, or potentially in order to harm people; not by nefarious AIs but by human hackers. In short, cybersecurity is about to leap into the physical world. Possible hacking scenarios may include: autonomous taxis (operated in association with, e.g., Uber) may be reprogrammed by hackers (e.g., terrorists) to go from pedestrian avoidance to pedestrian seek-and-destroy behavior; autonomous tractor-trailers may be reprogrammed by cybercriminals to deliver their valuable cargo directly to thieves; smart appliances may be reprogrammed by hackers to overload the electrical grid by means such as synchronized motor pulsing, or simply to damage themselves causing billions of dollars of damage in seconds; IOT-connected coffee makers may be hacked to catch fire and burn down buildings and homes; the Tesla Powerwall may be hacked to overcharge, overheat, and catch fire or explode. Numerous other possible example scenarios could be listed here as well.

OVERVIEW

Presently disclosed are methods and systems for validating an autonomous system that comprises a static-code module and a dynamic-code module.

In some embodiments, a method of validating an autonomous system that includes a static-code module and a dynamic-code module includes the steps of: performing a code-integrity-validation process on the static-code module and performing a behavior-integrity-validation process on the dynamic-code module.

In some embodiments, performing the code-integrity-validation process on the static-code module includes performing a signature-verification process on the static-code module. In some embodiments, the method is carried out by a secure-processing component.

In some embodiments, performing the behavior-integrity-validation process on the dynamic-code module includes performing the behavior-integrity-validation process on the dynamic-code module using an encrypted-and-signed test vector. In some embodiments, performing the behavior-integrity-validation process on the dynamic-code module using the encrypted-and-signed test vector includes generating an encrypted-and-verified test vector at least in part by verifying a signature of the encrypted-and-signed test vector, generating a decrypted-and-verified test vector at least in part by decrypting the encrypted-and-verified test vector, applying the decrypted-and-verified test vector to the dynamic-code module and receiving a corresponding actual output, and checking whether the received actual output is within acceptable parameters of a range of stored expected outputs.

In some embodiments, performing the behavior-integrity-validation process on the dynamic-code module using the encrypted-and-signed test vector includes generating a decrypted-and-signed test vector at least in part by decrypting the encrypted-and-signed test vector, generating a decrypted-and-verified test vector least in part by verifying a signature of the decrypted-and-signed test vector, and applying the decrypted-and-verified test vector to the dynamic-code module and receiving a corresponding actual output, and checking whether the received actual output is within acceptable parameters of a range of stored expected outputs.

In some embodiments, the encrypted-and signed test vector may include multiple signatures and/or multiple encryptions, as would be known to those of skill in the art.

In some embodiments, the method further includes generating an encrypted-and-verified expected output at least in part by verifying a signature of an encrypted-and-signed expected output and generating the stored expected output at least in part by decrypting the encrypted-and-verified expected output.

In some embodiments, the method further includes generating a decrypted-and-signed expected output at least in part by decrypting an encrypted-and-signed expected output, and generating a decrypted-and-verified expected output least in part by verifying a signature of the decrypted-and-signed expected output.

In some embodiments, the encrypted-and-signed expected output may include multiple signatures and/or multiple encryptions, as would be known to those of skill in the art.

In some embodiments, the method further includes receiving both the encrypted-and-signed test vector and the encrypted-and-signed expected output as part of a secure update. In some embodiments, the secure update includes a secure on-site update. In some embodiments the secure update includes a secure over-the-air update, a local update, and/or a remote update.

In some embodiments, the method further includes determining that (i) the code-integrity-validation process on the static-code module returned a code-integrity-confirmed result and (ii) the behavior-integrity-validation process on the dynamic-code module returned a behavior-integrity-confirmed result, and responsively permitting continued autonomous operation of the autonomous system.

In some embodiments, the method further includes determining that one or both of the code-integrity-validation process on the static-code module and the behavior-integrity-validation process on the dynamic-code module returned an integrity-fail result, and responsively disabling autonomous operation of the autonomous system. In some embodiments, the autonomous system includes a manual operation mode, and wherein disabling autonomous operation of the autonomous system includes continuing to permit manual use of manual operation mode in the autonomous system. In some embodiments, manual operation mode includes manual operation of an autonomous driving vehicle.

In some embodiments, the integrity-fail result signals to the autonomous system to disable manual operation of the autonomous system, effectively creating a total system shutdown of the autonomous system. In some embodiments, disabling autonomous operation of the autonomous system includes effecting a learning-system reset of the autonomous system.

In some embodiments, the method is carried out as part of an initialization sequence of the autonomous system. In alternative embodiments, the method is carried out during runtime operation of the autonomous system.

In some embodiments, performing the behavior-integrity-validation process on the dynamic-code module includes selecting a test vector from among a plurality of test vectors, and performing the behavior-integrity-validation process on the dynamic-code module using the selected test vector. In some embodiments, selecting the test vector includes randomly selecting the test vector.

In some embodiments, performing the behavior-integrity-validation process on the dynamic-code module includes selecting a test vector from among a plurality of test vectors, generating a modified test vector at least in part by modifying the selected test vector, and performing the behavior-integrity-validation process on the dynamic-code module using the modified test vector. In some embodiments, the selected test vector includes a video component. In some embodiments, modifying the selected test vector includes changing a luminance level of the video component. In some embodiments, modifying the selected test vector includes introducing objects into the selected test vector. In some embodiments, modifying the selected test vector includes modifying object location in the video component. In some embodiments, modifying the selected test vector includes modifying object location in Lidar test vectors. In some embodiments, modifying the selected test vector includes modifying object types in video components or Lidar test vectors. In some embodiments, modifying the selected test vector includes introducing noise into the test vector. In some embodiments, modifying the selected test vector includes changing lighting and shadows in test video components. In some embodiments, modifying the selected test vector includes modifying the speed and/or direction of objects in the selected test vector. The above embodiments include modifying test video components, however it should be noted that in more general embodiments, any type of raw sensor data (Lidar data, Radar data, IR data, etc.) may be modified using selected test vectors. In some embodiments, the raw sensor data may be securely stored encrypted-and-signed fake/reference sensor data that is used during an initialization process. In some embodiments, the raw sensor data may be actual sensor data received from the sensor's systems that may be used while performing validation processes during runtime.

In some embodiments, performing the behavior-integrity-validation process on the dynamic-code module using the modified test vector includes applying the modified test vector to the dynamic-code module and receiving a corresponding modified-test-vector actual result, generating a modified expected result by modifying a stored expected result in accordance with the modified test vector, and checking whether the received modified-test-vector actual result matches the modified expected result.

In some embodiments, the autonomous system includes an autonomous vehicle. In some embodiments, the static-code module includes a behavior arbiter that is configured to receive movement-vector-and-threat-level input and to produce corresponding driving-command output for the autonomous vehicle.

In some embodiments, the dynamic-code module includes a neural network that is configured to receive 3D input data and to produce corresponding clustered-object output data, and performing the behavior-integrity-validation process on the dynamic-code module includes sending test-vector 3D-input data to the neural network and receiving corresponding clustered-object actual-output data and comparing the received clustered-object actual-output data with stored clustered-object expected-output data corresponding to the test-vector 3D-input data. In some embodiments, the dynamic-code module includes a deep learning network (i.e. an artificial neural network with many hidden layers). In some embodiments, the dynamic-code module includes decision trees. In some embodiments, the dynamic-code module includes a Bayesian network. In some embodiment, the dynamic-code module includes a deep Q-network.

In some embodiments, the dynamic-code module includes a classifier module that is configured to receive clustered-object data and to produce corresponding classified-object output data, and performing the behavior-integrity-validation process on the dynamic-code module includes sending test-vector clustered-object data to the classifier module and receiving corresponding classified-object actual-output data and comparing the received classified-object actual-output data with stored classified-object expected-output data corresponding to the test-vector clustered-object data.

In some embodiments, the dynamic-code module includes a threat-assessment module that is configured to receive classified-object data and to produce a corresponding threat-matrix data and performing the behavior-integrity-validation process on the dynamic-code module includes sending test-vector classified-object data to the threat-assessment module and receiving corresponding threat-matrix actual-output data and comparing the received threat-matrix actual-output data with stored threat-matrix expected-output data corresponding to the test-vector classified-object data.

The embodiments listed in this overview section are provided by way of example only and not by way of limitation. Other embodiments are disclosed as well, and the scope of the claims should not be limited by the presence or absence of a given embodiment in this overview section.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
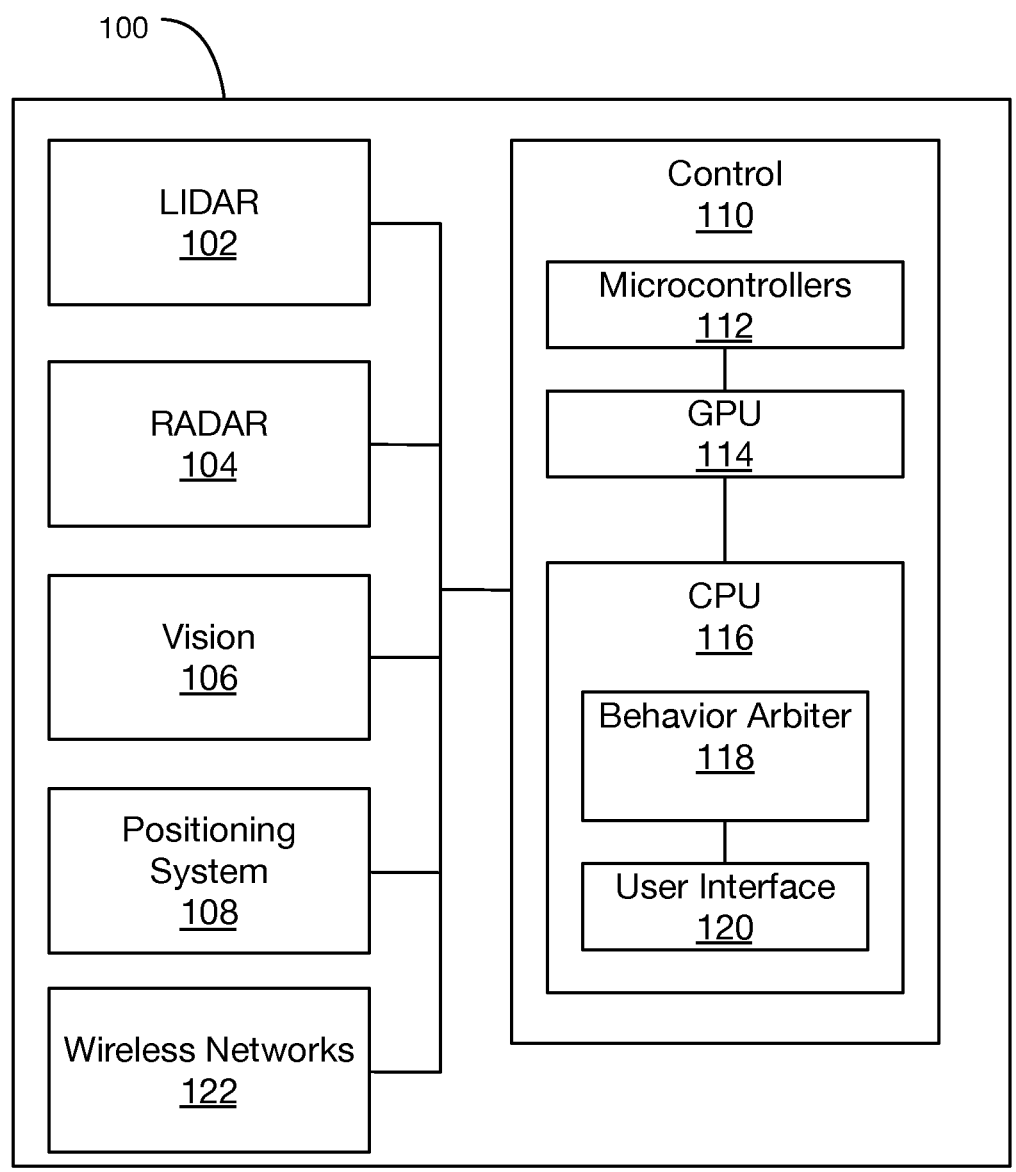
FIG. 1 depicts a block diagram of an autonomous system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseum in this detailed description.

FIG. 1 depicts a block diagram of an autonomous system, in accordance with some embodiments. As shown, autonomous system 100 includes a LIDAR 102, a RADAR 104, a vision system 106, a positioning system 108, wireless networks 122, control module 110 which includes microcontrollers 112, Graphics Processing Unit (GPU) 113, and central processing unit (CPU) 116, which includes behavior arbiter 118, user interface (UI) 120.

Lidar 102 system may be configured to scans an area and create a "point cloud" representing distances to various objects. This data may be pre-processed by the Lidar using a microcontroller, and then sent via the cars network back to the main CPU for behavior arbitration. Lidar systems may be susceptible to hacks by altering data in the point cloud. If the embedded microcontroller can be updated over the network, rogue software may be loaded on the Lidar. Hacks may include blind spot creation (e.g., throw away or modify data that looks "pedestrian sized"). In some embodiments, Nagra On-Chip Security (NOCS) 3.0 and secure chip-set startup (SCS) may check to make sure the only software running on the sensor is legitimate. Another hacking opportunity may be network interception of data. Any open controller on the network (including passenger cell phones if the networks are shared) may intercept and modify the packets containing Lidar data. In some embodiments, conditional access kernels (CAKs) may be run on all processors and send all data encrypted in an entitlement management message (EMM) protected format. Some embodiments may include firewalls and virtual private networks (VPNs) (Cybersecurity group) between sensors and arbiter code.

Radar system 104 may be used for various functions such as adaptive cruise control. In some embodiments, the autonomous system 100 may include multiple Radar units surrounding the autonomous system 100. In some embodiments, Radar system 104 may include a local microcontroller similar to that of the Lidar system, the microcontroller can be configured to pre-process the data before it is sent to the behavior arbiter 118 over the autonomous system's network.

Vision system 106 may include standard cameras and/or sensors such as infrared (IR), optical, ultrasonic, etc. configured to "visually" look around the autonomous system 100. Vision system 106 may be a less expensive system than Lidar, however vision system 106 may require a GPU. Data captured by vision system 106 may be sent to the GPU for further processing before being sent to behavior arbiter 118. The vision system 106 may include simple analog lines from camera modules to the GPU 114. In such embodiments, there is likely no serious hacking threat on these sensors. However, cables add to the weight and complexity of a cars wiring system so in some embodiments the vision system 106 and GPU 114 may be connected over the network. In such embodiments, the cameras may digitize and send video back to the GPU. The data may also be pre-processed by algorithms (artificial retina) to reduce the workload on the GPU and compressed to reduce the bandwidth requirements. In such embodiments, the vision system 106 has similar vulnerabilities to the Lidar 102 above, however since this is video data then the cameras may actually run real CAKs; the same as would be used in STBs to protect and verify the data.

Positioning system 108 may be configured to provide data representing location of the autonomous system 100. In some embodiments, the positioning system 108 may include a global positioning system (GPS), Global Navigation Satellite System (GLONASS), GALILEO satellite navigation a dead reckoning (DR) position system, a long-range navigation (LORAN) system, a GEE navigation system, or any other navigation/positioning systems known to those of skill in the art. In some embodiments, the data may be used in navigating the autonomous system (e.g., navigating an autonomous truck to a shipping destination.) In some embodiments, the navigation may also use data from other sources such as digital road maps (including speed limits, traffic, weather, construction, one-way street directions, etc.) In some embodiments, the positioning system 108 may be hacked and give the autonomous system 100 false directions to a different location. Navigation becomes critical to an autonomous system 100 since it is likely the only system capable of directing the autonomous system 100 to its final destination. Holes may include the usual data over the network issues that have already been discussed. Some positioning systems may have a unique and separate security hole that may be spoofed by RF signals overpowering and imitating the positioning satellites. There may also be other methods of interfering with accurate determination of current position in positioning systems that may not use satellites.

GPU system 114 may be configured to process sensor data from vision system 106 into meaningful information used by behavior arbiter 118. In some embodiments, the output may be coordinates and velocities such as "pedestrian at x,y,z velocity=", and "car at x,y,z, velocity=". Hacking this system may require a high level of sophistication in order to reprogram the vision and AI systems. However, if a hacker had such abilities, the hacks on this system could be particularly devious. In some scenarios the vision system may be reprogrammed to seek out and crash only into particular buildings or important people. The code could sit there for years unnoticed. Similar countermeasures mentioned above (NOCS3.0, SCS checking, etc.) still apply, but this is also an opportunity for security audits and reviews of code and inter-process communications. Full security review may be called for since the GPU is likely to be running a more sophisticated OS than the microcontrollers and sensors.

Microcontrollers 112 may be microcontroller systems in various modern autonomous systems (e.g., anti-lock braking system (ABS) breaking, accelerator pedal, dumb-cruise controller, etc.). In cases in which autonomous system 100 is an autonomous car, these systems receive input not just from the brake pedal or accelerator but also via the car's network from the output of the behavior arbiter, as well as various other components of the autonomous vehicle. In some embodiments, these systems control the critical breaking, steering, and accelerator functions of an autonomous vehicle. Since the autonomous car is configurable to drive itself, the microcontrollers may be connected to the network for communications with the behavior arbiter and configurable to gain complete control of the vehicle, presenting a critical and obvious hacking target. Security holes may include all of the same issues with Lidar and Radar systems, however, as these are the control outputs, rogue software may be hidden in the microcontrollers to implement scenarios such as complete break failure simultaneously across many autonomous vehicles. In other scenarios, a specific sequence of turns could activate waiting malware hiding inside the steering controller waiting to cause an accident, or pedestrian detection sensors could decide to cover up small humans causing collisions with children. Given the critical nature of these controllers, securing them with security modules in the areas of boot security, SCS checking, and network security may be used in embodiments described herein.

In some embodiments as shown, CPU 116 includes behavior arbiter 118. Behavior arbiter 118 is the core of the autonomous system. Behavior arbiter 118 may receive input from all of the sensors (sensor fusion), add in the goals (GPS, street directions, etc.) and may output steering, accelerator and breaking commands to an actuator control system. In some embodiments, CPU 116 may also be configured to inform any occupants of its status. In some embodiments, behavior arbiter 118 is contained in threads running on fairly powerful CPU(s). In some embodiments, the main CPU may be running Linux, and may have various processes running that range in importance from critical to trivial. Critical processes include the autonomous vehicle systems. Such processes may include behavior arbiters that will determine, in a state machine, what sensor input is the most critical and how to respond. A very simplified pseudo-code may look something like: if a pedestrian is in front of the car, slow down and stop. A hacker may potentially find this code and simply invert it to: if a pedestrian is in front of the car, accelerate and ignore the brake pedal. Such a change could turn an autonomous system into a killing machine. Nagra Advanced Security Certification (NASC) reviews of kernel process security, security audits, and code reviews are all countermeasures that embodiments may offer to prevent these sorts of attacks. The main CPU is also a critical gateway that a hacker could use to get into the car's other systems. A potential point of entry may be a hacker infecting a mobile device, and that mobile device connects to the audio system run by the main CPU. Another example may be malware inside MP3 audio files using the car stereo as a gateway to safety critical systems. In some embodiments, a code-integrity-validation process may be used to ensure that the behavior arbiter 118 has not been tampered with. In some embodiments, the code-integrity-validation process may be done using a signature-validation process.

Figure 4:
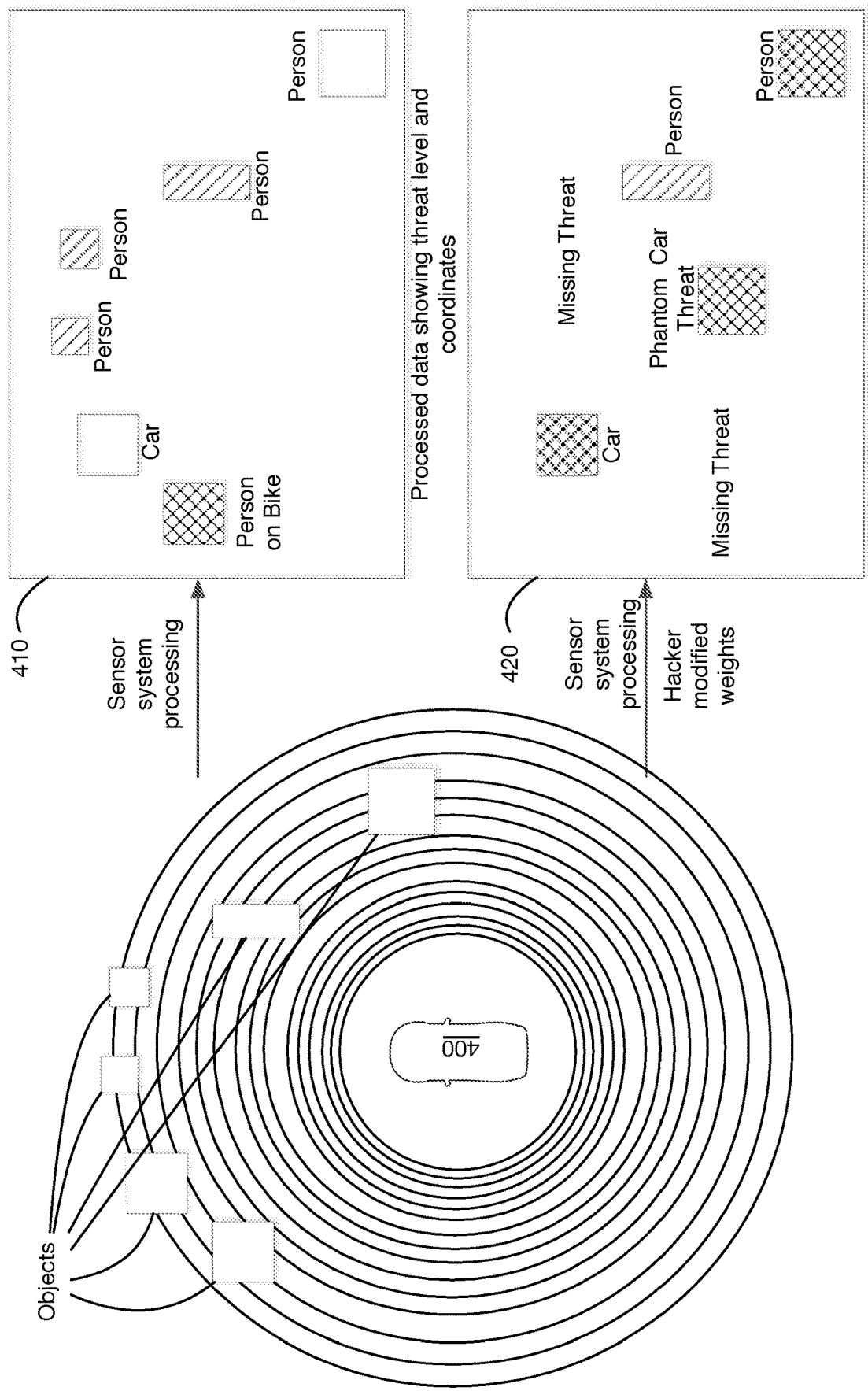
FIG. 4 depicts an example of hacking a Lidar sensor system.

In addition to the usual instrument panel output, user interface 120 may display processed sensor data for a user (e.g., as shown in FIG. 4). The user interface 120 may also receive destination information and output a map determined by positioning system 108. An entertainment system may include the capacity to play videos to multiple screens in the car as well as music, video games, applications from removable flash drives and/or Bluetooth connected devices, and auditory and/or visual notifications and alerts related to the state of the autonomous system 100.

Autonomous system 100 may also include wireless networks 122. Wireless networks 122 may take the form of wireless local area networks (WLAN) such as WiFi and/or Bluetooth. In some embodiments, wireless network module 122 may also have cellular connections, such as 3G, 4G, LTE, or any other cellular networks known to those of skill in the art. In some embodiments, wireless networks 122 may also include iridium or satellite networks. In some embodiments, wireless networks 122 may also include radio data networks. In some embodiments, wireless networks 122 may include worldwide interoperability for microwave access (WiMAX) networks, as well as POCSAG or other pager networks. The wireless networks 122 may be common points of external attacks. For example, image malware may get in from a user's Wi-Fi tablet. Security audits can help harden these networks; while NASC standards and testing can help to mitigate the damage rogue code could do if it did get on the autonomous system's networks.

Figure 2:
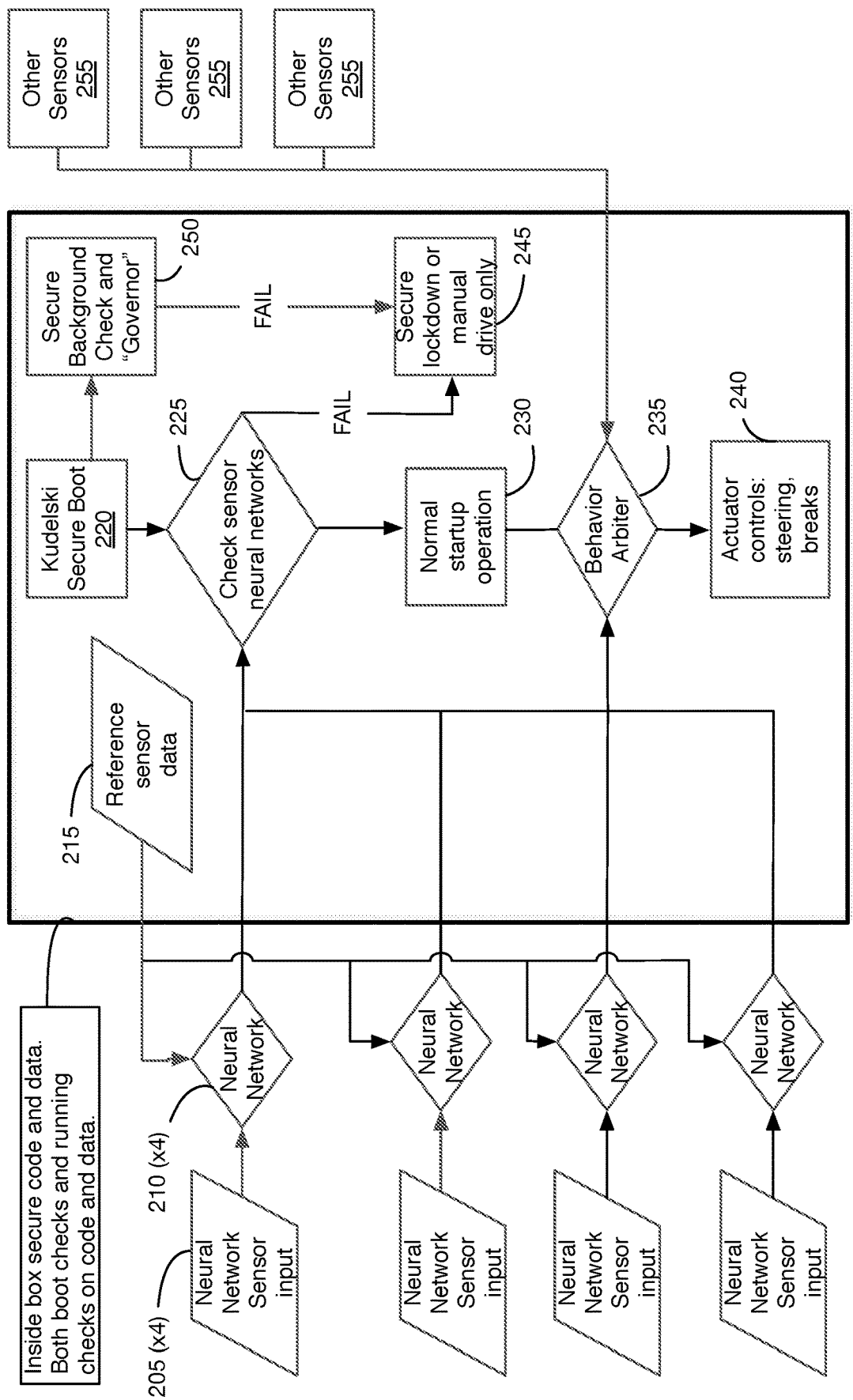
FIG. 2 depicts a secure core processor showing secure boot-up AI checks and a secure arbiter, in accordance with some embodiments.

FIG. 2 depicts a secure core processor showing secure boot-up AI checks and a secure arbiter, in accordance with some embodiments. As shown, the secure core processor boots up using Secure Boot 220. The secure background check and governor block 250 provides a code-integrity-validation process on a static-code module to ensure that the static-code module has not been tampered with by a hacker. If a determination has been made that the governor has been tampered with, the autonomous system is placed in secure lock down, or manual drive only is enabled at block 245. Further, sensor neural networks are checked at block 225 based on received data from a dynamic-code module (depicted in FIG. 2 as neural networks 210). Neural networks receive neural network sensor input 205 and reference sensor data 215 in order, and based on the action of neural network 210, block 225 performs a behavior-integrity-validation process on the dynamic-code modules to decide if they have been tampered with. If a determination that the neural networks 210 have been tampered with, then a secure lockdown or enabling manual operation only takes place at block 245. If they have not been tampered with, then normal startup ensues at block 230. Following normal startup, based on information received from neural networks 210 as well as other sensors 255, behavior arbiter 235 commands servo controls shown in 240, such as actuator controls, steering, and breaks. FIG. 2 illustrates a secure boot and validation process that is initialized at system startup, however it should be noted that such a validation process may be performed anytime during system runtime as well.

Figure 3:
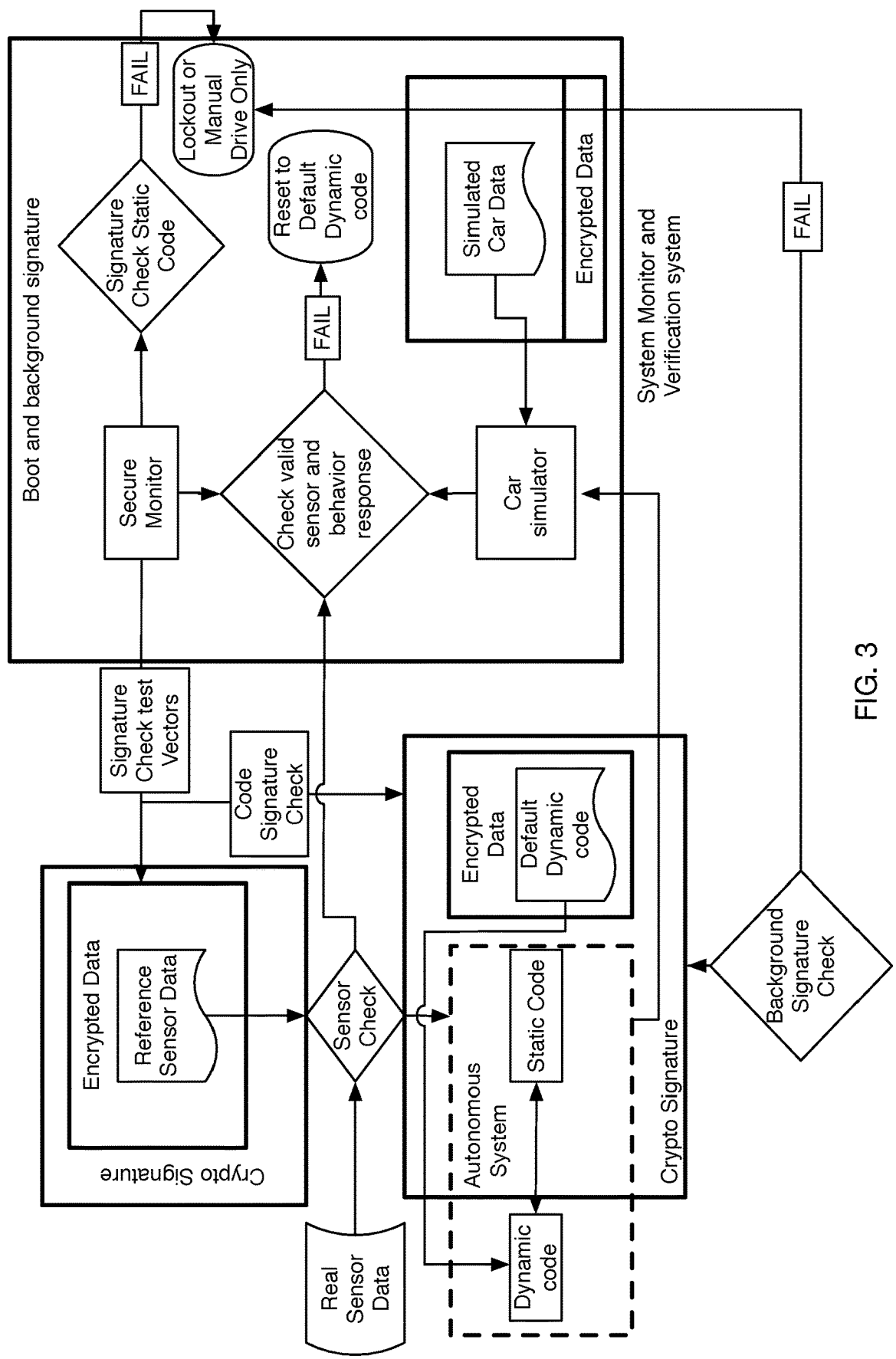
FIG. 3 depicts a block diagram of an encryption structure of an autonomous system, in accordance with some embodiments.

FIG. 3 illustrates the autonomous system of FIG. 2 with secure encryption modules and crypt-signature modules. In some embodiments, the code-integrity-validation process and behavior-integrity-validation process are performed as part of an initialization process. In such embodiments, the secure monitor may signature check the static-code module to verify the integrity of the static-code, and to ensure the static-code as not been modified. Note that the dynamic-code module may not be signature checked in some embodiments, as the dynamic code may continuously learn and update itself, which may cause a failure during the signature check. Further, the secure monitor may perform a behavior-integrity-validation process on the dynamic code of the autonomous system. In some embodiments, encrypted-and-signed reference sensor data may be decrypted and securely checked, and input into the autonomous system. The encrypted-and-signed reference sensor data may be decrypted and verified into decrypted-and-verified test vectors, and presented to the dynamic code in the autonomous system. In some embodiments, the autonomous system includes a neural network configured to analyze the decrypted-and-verified test vectors to determine potential threats, such as a passing car, or a person on a bike. The autonomous system may provide analyzed sensor data to the car simulator, which may receive ideal car characteristics from the encrypted simulated car data, and the car simulator output may be checked to determine if it is within acceptable parameters. In some embodiments, the acceptable parameters for an autonomous vehicle may include braking velocity based on weather conditions, collision avoidance, stopping at stop signs, or various other types of behaviors of safe driving. In some embodiments, the acceptable parameters may include a list of possible scenarios and expected outcomes such as detecting a stop sign and responsively braking. In some embodiments the secure monitor may perform code and behavior-integrity-validation checks during system runtime. In such embodiments, the real sensor data may be injected with secure test vectors, which are then run through the car simulator. The car simulator output may be checked the same way it was checked in the previous embodiments; however, continuous monitoring allows for more protection. In some embodiments, the real sensor data modified with test vectors is discarded to prevent the car's dynamic code from learning from the modified real sensor data. In some cases, malicious hacking is not always the culprit of safety hazards in autonomous systems. In some embodiments, the learning system in the dynamic-code module may become corrupt due to poor user habits (e.g., an autonomous car's learning system may become corrupt if the user trains it with unsafe driving habits). In embodiments subsequent to determining the car simulation as a fail, the dynamic code may be reset with a default dynamic code. In FIG. 3, the default dynamic code is shown to be encrypted-and-verified. The default dynamic code may be signature checked to ensure that the default dynamic code has not been modified without authorization, as the default dynamic code does not actively "learn." In some embodiments, the only way for the default dynamic code to change is through a secure update. After the dynamic-code module in the autonomous system is reset, the dynamic-code module may begin learning again. In some embodiments, if the static code and/or dynamic code fail signature checks and/or behavior validations, the autonomous system may be put into manual mode only until the autonomous system is corrected (e.g., through a software update, system reset, etc.)

FIG. 4 depicts an embodiment of an autonomous system's neural network identifying objects based on processing of sensor data. As shown, autonomous system 400 (shown in FIG. 4 as an autonomous vehicle) is using a sensor system to detect nearby unknown objects (depicted as empty boxes). In some embodiments, the sensor system may include a Lidar system, a Radar system, depth sensors, ultrasonic sensors, a camera system, optical components, or any combination thereof. In FIG. 4, the sensor system uses Lidar to detect the nearby objects. In a fully functional autonomous system, the dynamic-code module may process sensor data from the sensor system to generate a map of potential threats as shown in the box 410. In some embodiments, the dynamic-code module may include a threat-assessment module configured to produce threat-matrix data. The pattern of the objects in boxes 410 and 420 depict various threat levels assigned by the threat-assessment module; a double hashed object may indicate a serious threat (e.g., a person on a bike passing directly in front of the autonomous vehicle), a single hashed object may indicate medium threat (people up ahead near a sidewalk or crossing the street during a red light), and no hashing may indicate a low threat object (e.g., a car traveling in the opposite direction in a lane across a barrier or a person safely out of the way). FIG. 4 depicts the threat levels as object patterns, however alternative embodiments may use other data formats or methods to "visualize" threat level. In some embodiments, colors may be used to indicate threat level (e.g., green=low, yellow=medium, red=high). In some embodiments, the threat levels may be displayed on a screen on a dashboard for a user inside the autonomous vehicle. Box 420 depicts an example of outputs of the dynamic-code module in a scenario where it has been hacked. as shown, the processing of the sensor system data along with hacker modified weights results in missing threats as well as a phantom object directly in front of the autonomous vehicle 400. The phantom object may cause the autonomous vehicle 400 to unnecessarily swerve to avoid hitting the phantom object, which may result in the car striking a person on the sidewalk or a car driving next to them. If the behavior-integrity-validation process identifies the dynamic-code module as being tampered with, then the autonomous system may be disabled in favor of manual mode only, preventing the car from causing malicious accidents.

Figure 5:
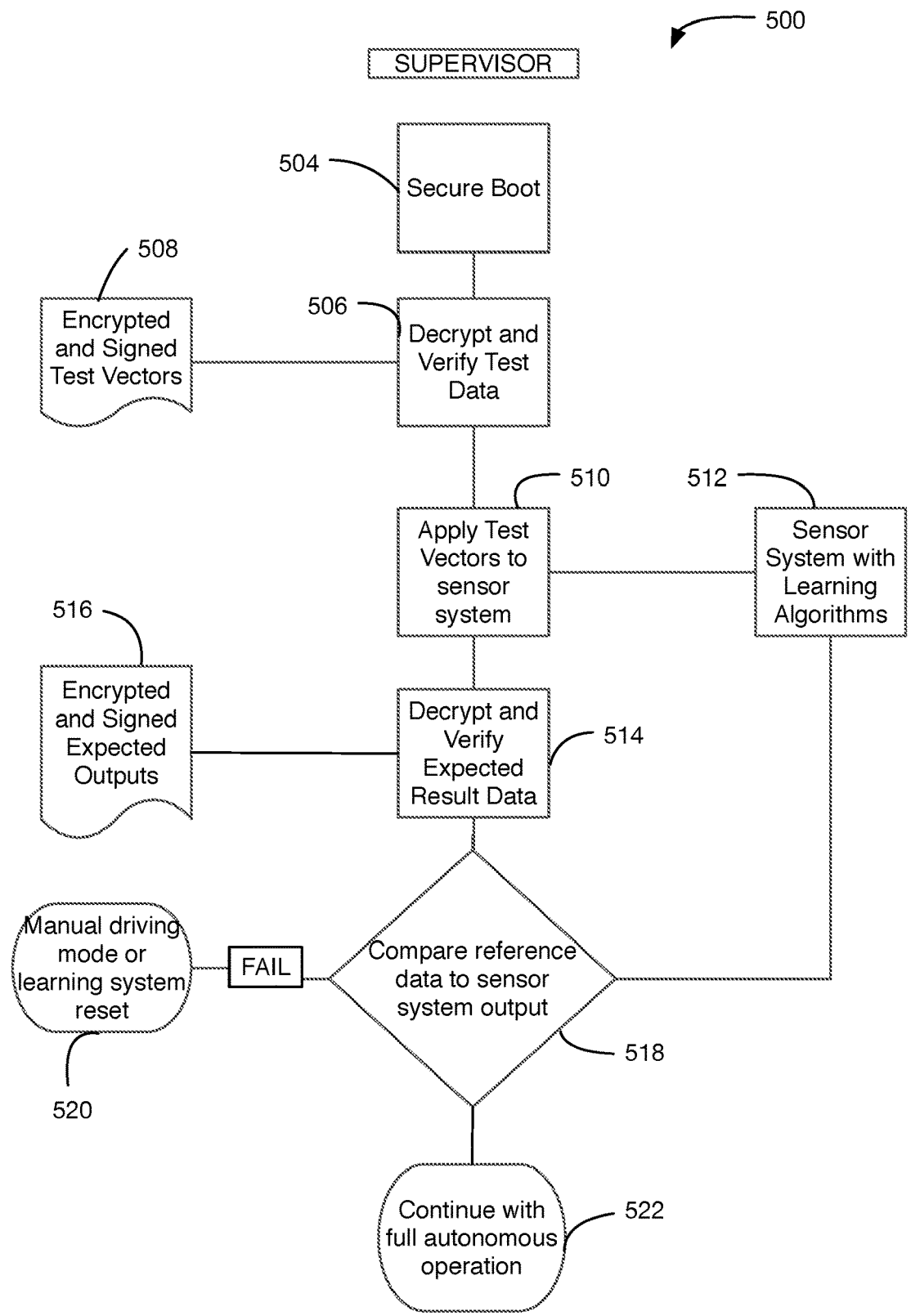
FIG. 5 depicts a flowchart of a supervisor program, in accordance with some embodiments.

FIG. 5 depicts a flowchart of a method 500 performed by a supervisor program, in accordance with some embodiments. As shown, the method includes the steps of secure booting at step 504, generating decrypted-and-verified test vectors at step 506 based on encrypted-and-signed text vectors 508, applying the test vectors to the sensor system at step 510, generating decrypted-and-verified expected outputs at step 514 based on encrypted-and-signed expected outputs 516, and comparing the decrypted-and-verified expected outputs to the outputs of the sensor system with learning algorithms 512. If the comparison returns an integrity-fail result, then in some embodiments, the manual driving mode is enabled at step 520. In alternative embodiments, the learning system may be reset at step 520. If the comparison yields an integrity-pass result, then the autonomous system continues with full autonomous operation at step 522. In some embodiments, the comparison at step 518 includes receiving the decrypted-and-verified actual outputs from step 512 and determines if the actual outputs meet acceptable parameters. In some embodiments, the acceptable parameters may include braking velocity based on weather conditions, stopping for stop signs/lights, braking for pedestrians, etc. In some embodiments, the actual outputs correspond to a set of common traffic scenarios, such as stop signs, stop lights, oncoming traffic, pedestrians crossing the street, etc. In some embodiments, the range of acceptable outputs may include predetermined behavior responses from the car such as braking, braking velocity, steering adjustment ranges, automatically turning on/off headlights, etc. that may be preset according to driving laws, for example. In some embodiments, when a test vector is selected that inserts a stop sign, for example, the range of acceptable outputs may include that the car should brake (decelerate) at a predetermined threshold. In an embodiment where the test vector inserts a child running 5 feet in front of the car from right to left, the range of acceptable outputs may include braking to 0 mph within 4 feet, and adjusting steering between 0 and 10 degrees to the right, if the child continues to run across the street, or steer left if the child stops and turns around. This may be done for various test vectors selected, and as long as the simulated car behavior remains within the ranges of acceptable output parameters for each selected test vector, the car may receive an integrity-pass result and continue in autonomous mode. In some embodiments, the integrity-fail result may be caused by an autonomous car learning unsafe driving habits unintentionally based on the car's primary driver, rather than a malicious hacking attempt. In such embodiments, the learning system reset may provide a default learning algorithm code that will begin learning habits again. The supervisor may use any of a variety of algorithms to perform a behavior-integrity-validation process on the dynamic-code module to check actual system outputs against ranges of acceptable expected outputs. Some example algorithms include MDX (where X is 4,5,6, etc.), SHA-X (where X is 1,256,384,512, etc.), GOST, RIPE, and Whirlpool, however embodiments herein are not limited to only the mentioned algorithms. As shown, the encrypted-and-signed test vectors 508 and expected outputs 516 may be securely stored (e.g., in secure elements) to prevent unauthorized access to such vectors. Modifying the test vectors and expected outputs that are used during the behavior-integrity-validation process may provide a possible hacking opportunity, and securely storing these vectors prevents such opportunities. Example algorithms for decrypting the securely stored vectors may include (but are not limited to) data encryption standard (DES), advanced encryption standard (AES), Rivest Cipher (RC) 5, Tiny Encryption Algorithm (TEA, XTEA, XXTEA), International Data Encryption Algorithm (IDEA), and MESH. In some embodiments, the supervisor runs the method 500 during an initialization process. In some embodiments, the supervisor runs the method 500 during system runtime.

Figure 6:
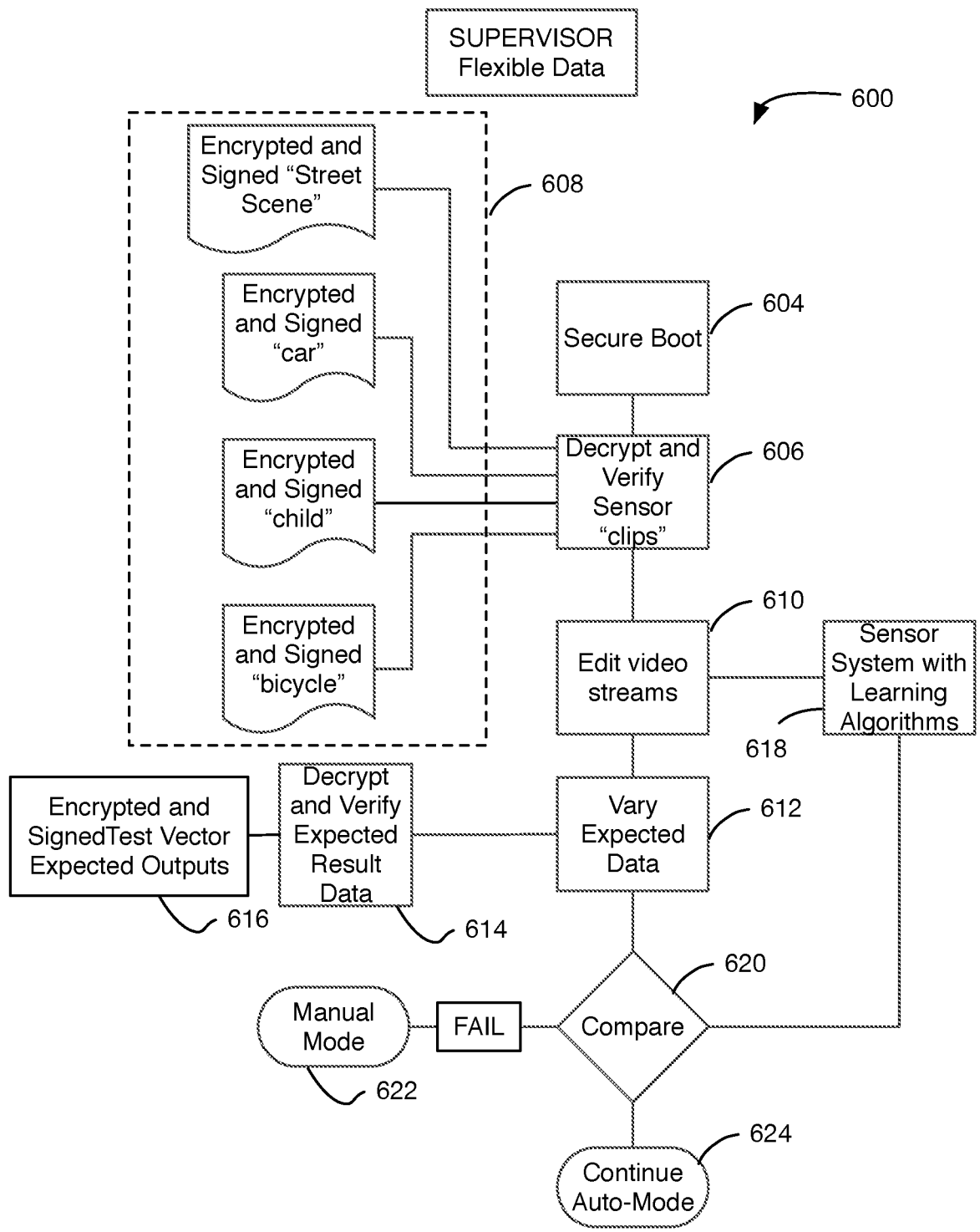
FIG. 6 depicts a flowchart of a supervisor program, in accordance with some embodiments.

FIG. 6 depicts a supervisor program utilizing modifiable test vectors. As shown, the method 600 carried out by the supervisor program includes securely booting at step 604, generating decrypted-and-verified test vectors at step 606 based on a variety of received encrypted-and-signed test vectors shown in the group 608. The verification ensures that a hacker has not previously modified the test vectors in any way. At step 610, a test video stream is modified according to the decrypted-and-verified test vectors, which is presented to the sensor system with the learning algorithm 618. Decrypted-and-verified expected outputs 614 based on encrypted-and-signed expected outputs 616 are varied at step 612 according to the decrypted-and-verified test vectors. A comparison is made at step 620 against the varied decrypted-and-verified expected outputs against the actual sensor system output from step 618. In some embodiments, the comparison step 620 may include determining if the actual sensor system output from step 618 is determined to meet acceptable parameters, as described above. If an integrity-fail result is determined by comparison 620, then the autonomous system may be put into a manual mode of operation at step 622. In some embodiments, step 622 may include resetting the dynamic-learning system. If an integrity-pass result is determined, then autonomous mode continues at step 624. In some embodiments, performing the behavior-integrity-validation process includes selecting a test vector and responsively modifying the selected test vector. In some embodiments, the selected test vector includes a video component. In some embodiments, modifying the selected test vector includes changing a luminance level of the video component. In some embodiments, modifying the selected test vector includes introducing objects into the selected test vector. In some embodiments, modifying the selected test vector includes modifying object location in the video component. In some embodiments, modifying the selected test vector includes modifying object location in Lidar test vectors. In some embodiments, modifying the selected test vector includes modifying object types in video components or Lidar test vectors. In some embodiments, modifying the selected test vector includes introducing noise into the test vector. In some embodiments, modifying the selected test vector includes changing lighting and shadows in test video components. In some embodiments, modifying the selected test vector includes modifying the speed and/or direction of objects in the selected test vector. In some embodiments, the supervisor may run method 600 at system startup, while in alternative embodiments method 600 may be run during system runtime. The supervisor program in FIG. 6 may use similar algorithms mentioned above for the supervisor program in FIG. 5.

Figure 7:
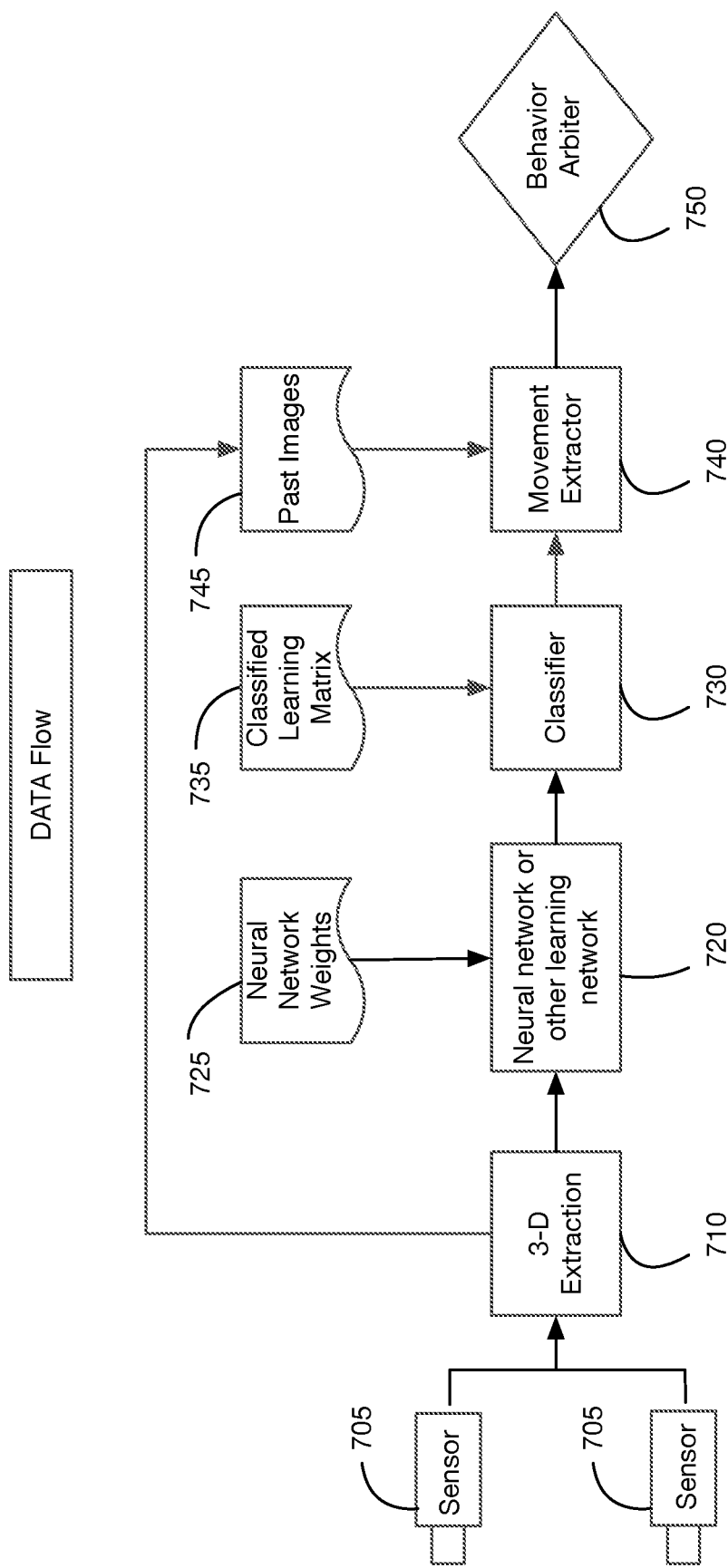
FIG. 7 depicts a flowchart of data flow, in accordance with some embodiments.

FIG. 7 depicts an example of an autonomous vehicle, in accordance with some embodiments. Sensor data from sensors 705 is sent for 3-D extraction at block 710. The neural network 720 in the dynamic-code module receives the 3-D input data as well as secure neural network weights 725, and produces cluster-object output data. Classifier 730 receives the clustered-object data from neural network 720 and classified-object actual-output data from the classified learning matrix 735, and compares the received classified-object actual-output data with the stored classified-object expected-output data corresponding to the test-vector clustered-object data. The movement extractor 740 may receive classified-object data from classifier 730 and provide a movement vector to behavior arbiter 750. In some embodiments, movement extractor 740 receives past image data 745 representing 3-D data previously extracted from 3-D extraction unit 710, and uses the past image data 745 when generating the movement vector. In some embodiments, previous threat-level information is used in generating the movement vector. In some embodiments, at least some of the threat-level information is learned by the dynamic-code module. In some embodiments at least some of the threat-level information is pre-programmed. In some embodiments, behavior arbiter 750 receives the movement vector and controls the actuator to perform tasks such as braking, accelerating, turning, etc.

Figure 8:
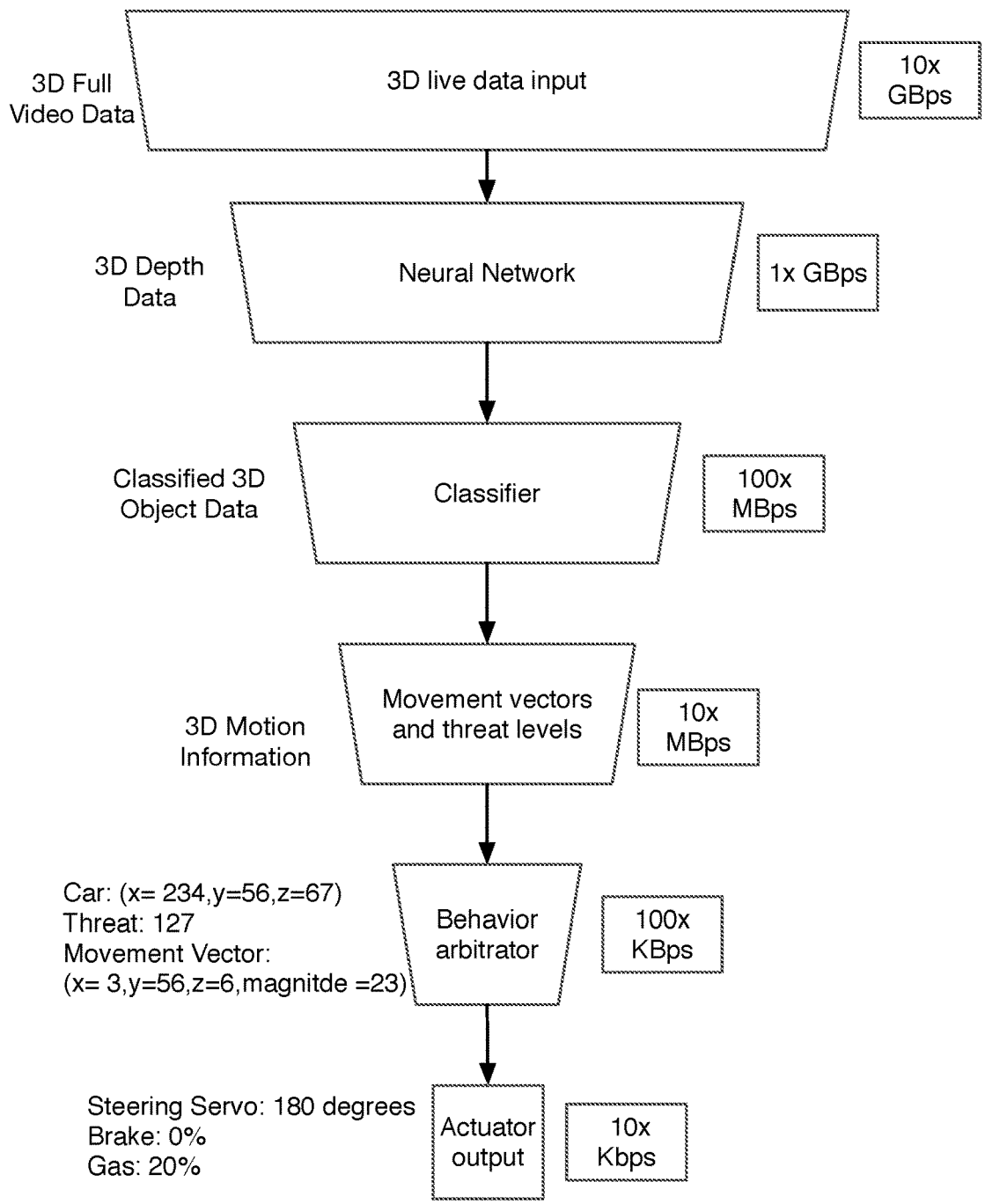
FIG. 8 depicts a block diagram of an autonomous system, in accordance with some embodiments.

FIG. 8 depicts an example block diagram of an embodiment according to the system shown in FIG. 7. Further, FIG.

8 depicts example data types that may be verified in an autonomous system, in accordance with some embodiments. It should be noted that the included bandwidths are approximate, and are in no way limiting. As shown in FIG. 8, the 3D live data input may be 3D video data from multiple cameras. In some embodiments, the 3D live data input may also be sensor data from Lidars, Radars, depth sensors, or various other types of sensors known to those of skill in the art. In some embodiments, the 3D video data utilizes a bandwidth of approximately 10 gigabytes per second (GBps). The 3D live data input may be raw 3D sensor data collected representing the autonomous system's surroundings (i.e. 3D data of what a user may actually see). The neural network may be configured to consolidate this raw, full bitrate data into 3D depth data. In some embodiments, the consolidated 3D depth data may have a utilized bandwidth of approximately 1 GBps. In some embodiments, the classifier may be configured to further consolidate the 3D depth data received from the neural network by identifying threat objects in the 3D depth data. In some embodiments, the classifier may have a utilized bandwidth of approximately 100 megabytes per second (MBps). The movement vector and threat level module may receive data from the classifier and further consolidate the data down to immediate threats (i.e., threats with a high threat level and that require immediate action to avoid), and generate movement vectors (a utilized bandwidth of approximately 10 MBps) to be used by the behavior arbiter (a utilized bandwidth of approximately 100 kilobytes per second (KBps)), to responsively control the actuator outputs (a utilized bandwidth of approximately 10 KBps) to avoid the immediate threats. In some embodiments, the 3D-video data input may be a test vector while running the behavior-integrity-validation process. Based on the 3D-video, a set of known outputs may be created and compared against the actual outputs of the dynamic-code module.

What is claimed is:

1. A method comprising:
   validating by an autonomous system a behavior integrity of a dynamic code module using test video content, comprising:
      modifying a test video stream of the test video content according to test data;
      inputting the modified test video stream to a sensor system of the autonomous system causing the sensor system to process the modified test video stream by detecting object images in the modified test video stream;
      receiving sensor system outputs that are a result of the processing of the modified test video stream from the sensor system, the received sensor system outputs being based on the detected object images in the modified test video stream;
      modifying expected outputs of the sensor system according to the modified test video stream; and
      comparing the received sensor system outputs based on the detected object images in the modified test video stream with the modified expected outputs; and
      if the received sensor system outputs are within a threshold of the modified expected outputs, enabling continued autonomous operation of the autonomous system using the sensor system, and otherwise disabling the autonomous operation of the autonomous system.

2. The method of claim 1, further comprising validating code integrity of a static code module, including:
   verifying a signature of the static code module, wherein verifying the signature generates a verification result;
   identifying that the static code module has not been modified if the verification result indicates a pass; and
   identifying that the static code module has been modified if the verification result indicates a failure.

3. The method of claim 2, further comprising, responsive to the identifying that the static code module has not been modified, enabling the autonomous operation of the autonomous system.

4. The method of claim 2, further comprising, responsive to the identifying that the static code module has been modified, disabling the autonomous operation of the autonomous system.

5. The method of claim 1, wherein the validating the behavior integrity of the dynamic code module further comprises validating the behavior integrity of the dynamic code module using an encrypted and signed test vector as the test data.

6. The method of claim 1, further comprising calculating the threshold of the modified expected outputs at least in part by verifying a signature of an encrypted and signed expected output.

7. The method of claim 1,
   wherein the test data is one or more test vectors; and
   wherein the validating the behavior integrity of the dynamic code module further comprises generating the one or more test vectors.

8. The method of claim 1,
   wherein the test data is one or more test vectors; and
   the method further comprising receiving the one or more test vectors and the threshold of the modified expected outputs as part of a secure update.

9. The method of claim 8,
   further comprising modifying the one or more test vectors,
   wherein modifying the one or more test vectors comprises modifying a location of one or more objects in a video component of the one or more test vectors.

10. The method of claim 1, further comprising:
    receiving, by a behavior arbiter of a static code module, a movement vector and threat level input; and
    producing, by the behavior arbiter, a driving command output, for the autonomous system, corresponding to the movement vector and threat level input,
    wherein the autonomous system comprises an autonomous vehicle.

11. The method of claim 1, wherein the validating the behavior integrity of the dynamic code module comprises executing at least one algorithm including: MD4, MD5, MD6, SHA-1, SHA-256, SHA-384, SHA-512, GOST, RIPE, and Whirlpool.

12. A method comprising:
    securely booting an autonomous system;
    validating a sensor system of the autonomous system including:
       generating encrypted and signed test vectors;
       generating decrypted and verified test vectors including test video components;
       inputting the test video components to the sensor system to cause the sensor system to process the test video components by detecting object images represented by the test video components and to generate outputs of the sensor system in response to the test video components based on the detected object images represented by the test video components;

generating decrypted and verified expected outputs based on the encrypted and signed test vectors;

comparing the outputs of the sensor system based on the detected object images represented by the test video components with the decrypted and verified expected outputs; and if the outputs of the sensor system in response to the test video components are different from the decrypted and verified expected outputs by more than a threshold, disabling autonomous operation of the autonomous system.

13. The method of claim 12, wherein the securely booting the autonomous system comprises verifying that a governor has not been modified.

14. The method of claim 12, further comprising validating code integrity of a static code module of the autonomous system, including:

verifying a signature of the static code module, wherein verifying the signature generates a verification result;

indicating that the static code module has not been modified if the verification result indicates a pass; and indicating that the static code module has been modified if the verification result indicates a failure.

15. The method of claim 14, further comprising, responsive to the indicating that the static code module has not been modified, enabling the autonomous operation of the autonomous system.

16. The method of claim 14, further comprising, responsive to the indicating that the static code module has not been modified, disabling the autonomous operation of the autonomous system.

17. The method of claim 12, wherein the generating decrypted and verified test vectors comprises executing at least one of the following algorithms on the encrypted and signed test vectors: a data encryption standard (DES), advanced encryption standard (AES), Rivest Cipher (RC) 5, Tiny Encryption Algorithm (TEA, XTEA, and XXTEA), International Data Encryption Algorithm (IDEA), and MESH.

18. The method of claim 12, wherein the disabling the autonomous operation of the autonomous system comprises disabling all driving of an autonomous driving vehicle.

19. The method of claim 12, wherein the disabling the autonomous operation of the autonomous system comprises resetting a dynamic code module with default dynamic code.

20. An apparatus comprising:

a processor; and a non-transitory computer-readable medium storing instructions that are operative, when executed by the processor, to perform a method comprising:

validating by an autonomous system a behavior integrity of a dynamic code module using test video content, comprising:

modifying a test video stream of the test video content according to test data;

inputting the modified test video stream to a sensor system of the autonomous system causing the sensor system to process the modified test video stream by detecting object images in the modified test video stream;

receiving sensor system outputs that are a result of the processing of the modified test video stream from the sensor system, the received sensor system outputs being based on the detected object images in the modified test video stream;

modifying expected outputs of the sensor system according to the modified test video stream; and comparing the received sensor system outputs based on the detected object images in the modified test video stream with the modified expected outputs; and if the received sensor system outputs are within a threshold of the modified expected outputs, enabling continued autonomous operation of the autonomous system using the sensor system, and otherwise disabling the autonomous operation of the autonomous system.

* * * * *